(12) United States Patent
Sheu et al.

(10) Patent No.: US 6,290,887 B1
(45) Date of Patent: Sep. 18, 2001

(54) METHODS FOR FLAME-RETARDING AND PRODUCTS PRODUCED THEREFROM

(75) Inventors: Jim J. Sheu, Dunwoody; Jennifer R. Meeks, Lawrenceville, both of GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/258,491

(22) Filed: Feb. 26, 1999

(51) Int. Cl.$^7$ ................................................. B29C 47/06
(52) U.S. Cl. .................. 264/171.14; 264/171.23
(58) Field of Search ................ 264/171.14, 171.23; 252/2, 609

(56) References Cited

U.S. PATENT DOCUMENTS

| | | | |
|---|---|---|---|
| 4,483,950 | 11/1984 | Fanta et al. | 524/48 |
| 4,767,825 | 8/1988 | Pazos et al. | 525/408 |
| 5,087,513 | 2/1992 | Kim | 428/283 |
| 5,305,410 | 4/1994 | Arroyo | 385/109 |
| 5,306,867 | 4/1994 | Connole et al. | 174/23 |
| 5,419,955 | 5/1995 | Ehrhardt et al. | 428/283 |
| 5,849,210 | 12/1998 | Pascente et al. | 252/3 |
| 5,859,077 | 1/1999 | Reichman et al. | 521/84.1 |
| 6,173,100 | 1/2001 | Newton et al. | 385/102 |

FOREIGN PATENT DOCUMENTS 0 425 269 A2   5/1991   (EP) .
WO 99/57201   11/1999   (WO) .

OTHER PUBLICATIONS

C. John Arroyo, Jim J. Sheu, and W.J. Paucke, The Use of Superabsorbent Materials in Optical Fiber Cable Design, 1991.
Fredric L. Buchholz and Nicholas A. Peppas, Superabsorbent Polymers, Science and Technology, 1993.
Fredric L. Buchholz and Andrew T. Graham, Modern Superabsorbent Polymer Technology, 1998.
Lisa Brannon–Peppas and Ronald S. Harland, Absorbent Polymer Technology, Studies in Polymer Science 8, 1990.

*Primary Examiner*—Jan H. Silbaugh
*Assistant Examiner*—Mark Eashoo
(74) *Attorney, Agent, or Firm*—Thomas, Kayden, Horstemeyer & Risley, LLP

(57) ABSTRACT

The present invention generally is directed to compositions, products and methods that utilize superabsorbent polymers for flame-retarding. A preferred method includes improving flame-retarding characteristics in products by adding SAPs to the product. Prior to the step of adding the SAPs, the product exhibits a first limiting oxygen index and after the step of adding the SAPs, the product exhibits a second limiting oxygen index, with the second limiting oxygen index being higher than the first limiting oxygen index. Preferably, the SAPs can be pre-loaded with moisture, thereby potentially further increasing the flame-retarding characteristics of the product. In a preferred embodiment, the product is configured as a cable, with the outer jacket of the cable incorporating the SAPs.

5 Claims, 9 Drawing Sheets

METHODS FOR FLAME-RETARDING AND PRODUCTS PRODUCED THEREFROM

CROSS-REFERENCE TO RELATED APPLICATIONS

Reference is made to U.S. patent application, Ser. No. 09/258,533, filed on Feb. 26, 1999 now U.S. Pat. No. 6,173,100.

BACKGROUND OF THE INVENTION

1. Field of the Invention

The present invention relates to flame-retarding and, in particular, to compositions, products and methods that utilize superabsorbent polymers for flame-retarding.

2. Description of the Related Art

Superabsorbent materials generally are known as materials which can absorb up to about one thousand (1000) times their weight in distilled water. Superabsorbent materials, such as superabsorbent polymers (SAPs), for instance, are utilized in numerous applications. SAPs are commonly used in incontinent products, such as diapers, and other hygiene products, primarily due to their aforementioned water-absorption characteristics. SAPs also possess certain water-blocking characteristics which are utilized in numerous other applications, such as by incorporating the SAPs into telecommunications and power cables, as described in U.S. Pat. No. 4,867,526, issued to Arroyo, for example. In these applications, the SAPs typically are incorporated below the outer jacket of the cable, such as in a water-blocking tape, for instance. Upon contact with water, the SAPs absorb the water and swell, thereby preventing migration of the water through the cable. Additionally, the swelled SAPs form a physical barrier which prevents more water from entering the cable.

In many applications, a combination of water-blocking and flame-retarding is desired. Heretofore, a prior art solution to attain the characteristics of water-blocking and flame-retarding has been to add flame-retardants to SAPs. However, this oftentimes results in a SAP composition which has reduced water-blocking characteristics as compared to the SAPs without the flame-retardants. Primarily, this is due to the chemical properties of the prior art flame-retardants which, typically, are salts or ionic compounds that are known to reduce the swelling of water-blocking materials. Generally, as more prior art flame-retardants are added to SAPs in an effort to improve their flame-retarding characteristics, the greater the water-blocking capacity of the SAPs is reduced. Frequently, the extent of reduction in water-blocking capacity of SAPs due to incorporation of flame-retardants can render the SAPs incapable of preventing water penetration.

Therefore, there is a need for improved compositions, products and methods which address these and other shortcomings of the prior art.

BRIEF SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

The present invention generally is directed to compositions, products and methods that utilize superabsorbent polymers for flame-retarding. A preferred method includes improving flame-retarding characteristics in products by adding SAPs to the product. Prior to the step of adding the SAPs, the product exhibits a first limiting oxygen index and after the step of adding the SAPs, the product exhibits a second limiting oxygen index, with the second limiting oxygen index being higher than the first limiting oxygen index. Preferably, the SAPs include polyacrylates, polyacrylamides, polyvinylalcohols and combinations thereof, including copolymers.

In accordance with another aspect of the present invention, the SAPs are pre-loaded with moisture, thereby potentially further increasing the flame-retarding characteristics of the product. Depending on the particular application, the SAPs can incorporate a moisture content of higher than approximately 0 percent, by weight.

In accordance with another aspect of the present invention, SAPs are added to a composition, such as a plastic, thereby improving the flame-retarding characteristics of the composition. In a preferred embodiment, SAPs-enriched plastic is formed as an outer jacket of a cable. Preferably, such a cable incorporates a transmission medium and an outer jacket surrounding the transmission medium, with the outer jacket being formed by an extrusion technique.

In accordance with still another aspect of the present invention, a preferred method for providing water-blocking and non-halogen flame-retarding in a product includes adding moisture to a superabsorbent polymer so that the limiting oxygen index of the superabsorbent polymer is increased. Products with improved flame-retarding characteristics can then be formed from the superabsorbent polymer.

The numerous features and advantages of the present invention will be more readily apparent from the following detailed description read in conjunction with the accompanying drawings.

BRIEF DESCRIPTION OF THE SEVERAL VIEWS OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
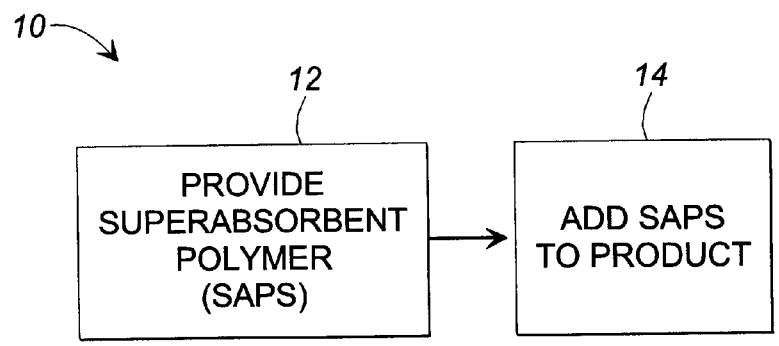
FIG. 1 is a block diagram illustrating a preferred method of the present invention.

Reference will now be made in detail to the description of the invention as illustrated in the drawings, wherein like reference numbers indicate like parts throughout the several views. As mentioned hereinbefore, superabsorbent polymers (SAPs) can absorb up to about one thousand (1000) times their weight in distilled water. When salts or ionic compounds are added to the water, however, a SAP's ability to absorb the water can be significantly reduced. For example, a gram of SAPs typically can absorb up to approximately 50 ml of sea water, which typically includes multiple ion species, i.e. monovalent, and divalent ions of sodium, magnesium, etc.

There are several reasons why SAPs do not work well in water containing a higher concentration of ions than distilled water. First, SAPs are sensitive to electrolytes or ions. As a result, the water absorbing capability of SAPs decreases substantially when the SAPs are exposed to salts, which are frequently electrolytes or ions. The extent of this decrease in water absorbency is frequently proportional to the concentration of the electrolytes. This decrease may be explained in terms of osmotic pressure, which is one of the mechanisms by which SAPs absorb water. An osmotic pressure gradient between the network of SAP and a surrounding aqueous solution determines the absorbency of the SAP. The osmotic pressure gradient between the network of the SAP and the surrounding aqueous fluid drives water into the network of the SAP. As SAPs are exposed to salts, a reduced water-absorbing capability of the SAPs occurs because the osmotic pressure gradient between the network of SAPs and the external salt solution decreases. For example, when the surrounding aqueous solution changes from distilled water (zero concentration in functional groups of electrolytes) to sea water (approximately three percent in various electrolytes), the concentration gradient decreases, thus causing the osmotic pressure gradient to decrease. This decrease in osmotic pressure gradient results in a decrease in absorbency of the SAP.

A second reason for the reduction in water-absorbing capability of a SAP is an effect referred to as the common ion effect, which also decreases the osmotic pressure. A third reason for the decrease in absorbency is multivalent ion complexation. In a multivalent ion environment, a multivalent ion will complex with carboxylate functional groups and limit polymer chain extension and charge repulsion between the carboxylate ions which, in turn, reduces water absorbency. A well known phenomena in water soluble polymer chemistry is referred to as salting out. A carboxylate containing water soluble polymer solution can be turned easily into a precipitation of polymer separated from aqueous solution by the addition of a multivalent ion, such as magnesium or calcium, for instance. Magnesium and other multivalent ions exist in sea water in low concentrations. The multivalent charges on the magnesium ion will attract and complex with carboxylates in polymer chains. In effect, the complexation of these polymer chains increases the molecular weight of the polymer which becomes insoluble in water and precipitates out of solution. In the case of a carboxylate containing SAP, the net effect of complexation of multivalent ions with carboxylates is crosslinking. The addition of such complexation or crosslinking upsets the optimum level of crosslinking introduced when SAPs are made. Therefore, the absorbency of the SAP is altered accordingly. This occurs in addition to the aforementioned drop in osmotic pressure gradient when SAPs are exposed to any salt solution, not necessarily multivalent salts.

As discussed hereinbefore, a SAP possessing the combined characteristics of water-blocking and flame-retarding is desired in many applications. Heretofore, a prior art solution to provide the desired characteristics of water-blocking and flame-retarding has been to add flame-retardants to SAPs. Prior art flame-retardants, such as non-halogen flame-retardants, for instance, are preferred in many applications because the non-halogen flame-retardants do not release acidic or toxic halogen containing acid/gas during burning. However, the addition of prior art flame-retardants oftentimes results in a SAP composition which has reduced water-blocking characteristics as compared to the SAP before the flame-retardants were added. Primarily, this is due to the chemical nature of the prior art flame-retardants. Generally, as more prior art flame-retardants are added to a SAP in an effort to improve its flame-retarding characteristics, the water-blocking capacity of the SAP is further reduced. Frequently, the extent of reduction in water-blocking capacity of a SAP due to incorporation of flame-retardants can render the SAPs virtually incapable of preventing water penetration. Examples of prior art non-halogen flame-retardants include magnesium hydroxide, zinc borates, zinc boro phosphates, and antimony oxides.

In accordance with the present invention, it has been discovered that SAPs possess heretofore unknown flame-retarding characteristics. Moreover, in preferred embodiments of the present invention (as described in detail hereinafter), SAPs can be effectively utilized as flame-retarding additives without reducing the water-blocking capacity of the compounds and/or products in which the SAPs are utilized.

In order to demonstrate the heretofore unknown flame-retarding characteristics of SAPs, a preferred method of the present invention 10 is provided (FIG. 1) which has been shown through experimentation to improve the flame-retarding characteristics of materials (and/or products) without reducing the water-blocking capacity of the materials. In a first step of method 10 (step 12), SAPs are provided. In a second step (step 14), the SAPs are added to a product. In some embodiments of the product, the product can include materials, such as SAPs, plastics, etc, prior to step 14. In products so configured, the SAPs preferably are blended with the materials of the product, such as by mixing the SAPs and the material in a mixer to form a substantially homogeneous SAPs composition. The SAPs composition typically is incorporated into the product in a manner similar to the manner in which the material was originally incorporated into the product. For example, and not for purposes of limitation, the SAPs composition can be molded, extruded, impregnated into matrices, formed onto substrates, and formed as intermediately disposed material layers, etc, It has been found that the addition of SAPs to a product in step 14 has produced the heretofore unexpected result of providing improved flame-retarding characteristics and, in particular, improved non-halogen flame-retarding characteristics to the product. Additionally, it has been found that the addition of the SAPs produces products which can retain their initial water absorption characteristics.

The mechanism or mechanisms by which the flame-retarding characteristics of materials are improved by practicing the present invention are not heretofore fully understood; however, the release of water molecules absorbed by and/or bonded to SAPs, the release of carbon dioxide molecules from the carboxylates of the SAPs, as well as the release of nitrogen and consumption of oxygen are considered important. Typically, in order to stop a fire, it is necessary to stop the combustion reaction of the fire. Fires generally are controlled and extinguished by, among others, cooling of the burning substrate and separating and/or replacing an oxidizing agent (air or oxygen). For example, water is an effective fire extinguishing agent because it possesses higher specific and latent heats (heat of evaporation, etc.) than those of most other extinguishing agents. On the other hand, carbon dioxide extinguishes fire by blanketing and smothering, thereby preventing oxygen from reaching the fire and the substrate. Once blanketing is maintained long enough to cool the substrate below the self-ignition temperature of the substrate, the fire is extinguished.

As discussed hereinbefore, SAPs generally are capable of absorbing and bonding with water molecules. In addition, some SAPs contain polyvinylalcohols. The hydroxyl groups in polyvinlyalcohols may be converted to water molecules. During a burning process of SAPs, water molecules absorbed, bonded and/or converted typically are released, thereby helping to extinguish a flame. However, even when no excess water has been absorbed into the network of the SAPs, as described in detail hereinafter, the SAPs typically exhibit the aforementioned improvement in flame-retarding characteristics. Therefore, it is hypothesized that carbon dioxide molecules of the SAPs also may be released during burning, such as from the carboxylates of polyacrylic acids and polyacrylates, thereby helping to extinguish the flame. In the case of SAPs consisting of copolymers of polyacrylamide and polyacrylate, the amide groups may be converted by oxygen to give nitrogen, carbon dioxide and water during the burning process. Nitrogen is known to have some flame-retardant action. At high temperatures, the nitrogen may also be further oxidized by oxygen, and thus consume more oxygen. As mentioned hereinbefore, both carbon dioxide and water help in extinguishing fire.

In order to demonstrate the aforementioned flame-retarding characteristics of SAPs, two series of tests were conducted. These tests determined the limiting oxygen indexes of particular samples. One series of tests was conducted in accordance with standard ASTM procedures (designation: D 2863-95), and the other series of tests was conducted using a modified version of the ASTM procedures, as described hereinafter. The first series of tests was used to measure the minimum oxygen concentrations required to support candle-like combustion of compositions made in accordance with a preferred method of the present invention. As described in greater detail hereinafter, the SAPs were blended with a plastic, e.g. DYNK (a non-halogen, unstabilized polyethylene, available from Union Carbide Corporation), in order to test the SAPs' flame-retardant characteristics when mixed with a composition. DYNK was chosen as a test composition due to the prevalence of its use in commercial applications, its relative ease of burning, and the need to improve its flame-retarding characteristics. It should be understood by one of skill in the art, however, that although the test data reproduced hereinafter was recorded from testing of DYNK incorporating SAPs, the test data clearly supports the conclusion that the improved flame-retarding characteristics exhibited by the DYNK specimens are a result of the SAPs and not any inherent properties of the DYNK.

Plastics enriched with SAPs are suitable for use in numerous applications. In particular, the plastics can be extruded to form an outer jacket of a cable, for instance. A cable, such as a telecommunications cable, typically incorporates an outer jacket formed of plastic that surrounds a core, with the core including at least one transmission medium, i.e. an optical fiber. By forming the outer jacket of the cable from the SAP-enriched plastics of the present invention, such a cable may exhibit improved flame-retarding characteristics over many prior art cables.

As described in greater detail hereinafter, the second series of tests was used to measure the minimum oxygen concentrations required to support combustion of SAPs when not mixed with a composition (during testing, it appeared unlikely that the SAPs were able to form Type C Specimens as set forth in the ASTM Standards).

Figure 2:
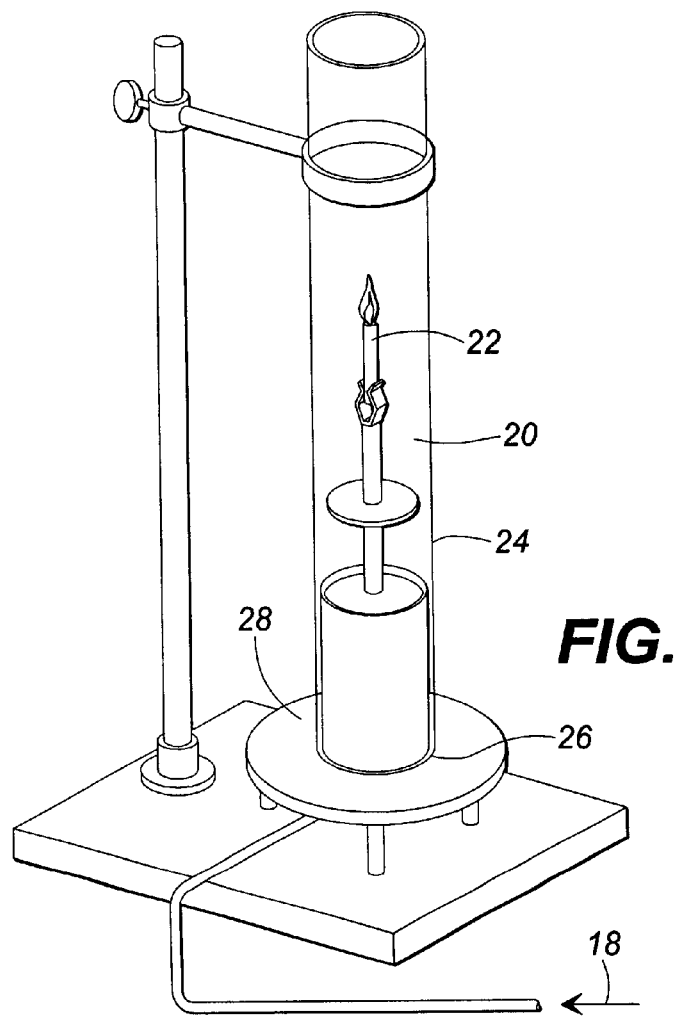
FIG. 2 is a perspective view of representative test equipment utilized in analyzing properties of compositions formed in accordance with the present invention.

In accordance with the test procedures, the minimum concentration of oxygen in a mixture 18 (FIG. 2) of oxygen and nitrogen flowing upward in a test column 20 that will just support combustion was measured under equilibrium conditions of candle-like burning. The equilibrium was established by the relation between heat generated from the combustion of a specimen 22 formed from a SAP-enriched composition, and heat lost to surroundings as measured by one of two arbitrary criteria, namely: (1) time of burning, or (2) length of composition burned. Test column 20 incorporated a heat resistant glass tube 24 which included a 75 mm minimum inside diameter and a 45 mm minimum height. The bottom 26 of the column was attached to a noncombustible base 28 which was adapted to mix and evenly distribute a gas mixture 18 entering column 20 through base 28. Each specimen 22 was placed within the column and a controlled flow of mixture 18 was allowed to enter the column. The specimen was then ignited with an ignition flame (not shown). The ignition flame was then removed and a timer started. Burning of each specimen was evaluated in accordance with standard ASTM procedures. The aforementioned procedures were then repeated with differing concentrations of oxygen until a critical concentration of oxygen was determined. Critical concentration of oxygen is defined as the lowest oxygen concentration that will yield standardized burn test results. Limiting Oxygen Index (LOI) then was calculated by the following equation:

$$LOI=(100 \times O_2)/(O_2+N_2)$$

where: $O_2$ is the volumetric flow of oxygen (mm$^3$/s) corresponding to the critical concentration; and, $N_2$ is the volumetric flow of nitrogen (mm$^3$/s) corresponding to the critical concentration.

Test samples were prepared utilizing three commercially available SAPs: ELF Atochem XFS, a polyacrylate type of SAP manufactured by Elf Atochem; Aqua Keep J550A, a polyacrylate type of SAP manufactured by Sumitomo Seika Chemicals; and, CA-100, a copolymer of polyacrylate and polyacrylamide types of SAPs manufactured by Stockhausen, Inc. Since particle size can affect the burning characteristics of material, particle size distributions for the SAPs utilized during the tests are set forth hereinafter in Tables 1–3.

TABLE 1

Particle Size Distribution (XFS)

| U. S. Standard Testing Sieve No. | Microns | Mass (g) | % (wt) |
|---|---|---|---|
| 20 | >850 | 0.0000 | 0.0 |
| 50 | 300–849 | 3.4774 | 2.3 |
| 60 | 250–299 | 3.4659 | 2.3 |
| 100 | 150–249 | 37.8439 | 25.3 |
| 140 | 106–149 | 64.372 | 43.0 |
| 200 | 75–105 | 25.0401 | 16.7 |
| 325 | 45–74 | 11.9072 | 8.0 |
| collectiontray | 0–44 | 3.5219 | 2.4 |

TABLE 2

Particle Size Distribution (J550A)

| U. S. Standard Testing Sieve No. | Microns | Mass (g) | % (wt) |
|---|---|---|---|
| 20 | >850 | 0.0032 | 0.0 |
| 50 | 300–849 | 21.5608 | 14.1 |
| 60 | 250–299 | 16.8709 | 11.0 |
| 100 | 150–249 | 73.636 | 48.1 |
| 140 | 106–149 | 26.8356 | 17.5 |
| 200 | 75–105 | 8.9702 | 5.9 |
| 325 | 45–74 | 3.868 | 2.5 |
| collectiontray | 0–44 | 1.2656 | 0.8 |

TABLE 3

Particle Size Distribution (CA-100)

| U. S. Standard Testing Sieve No. | Microns | Mass (g) | % (wt) |
|---|---|---|---|
| 20 | >850 | 2.2130 | 1.8 |
| 50 | 300–849 | 16.4482 | 13.6 |
| 60 | 250–299 | 4.4415 | 3.7 |
| 100 | 150–249 | 5.9787 | 4.9 |
| 140 | 106–149 | 4.6690 | 3.9 |
| 200 | 75–105 | 33.9538 | 28.1 |
| 325 | 45–74 | 29.3455 | 24.3 |
| collectiontray | 0–44 | 23.7671 | 19.7 |

Figure 3:
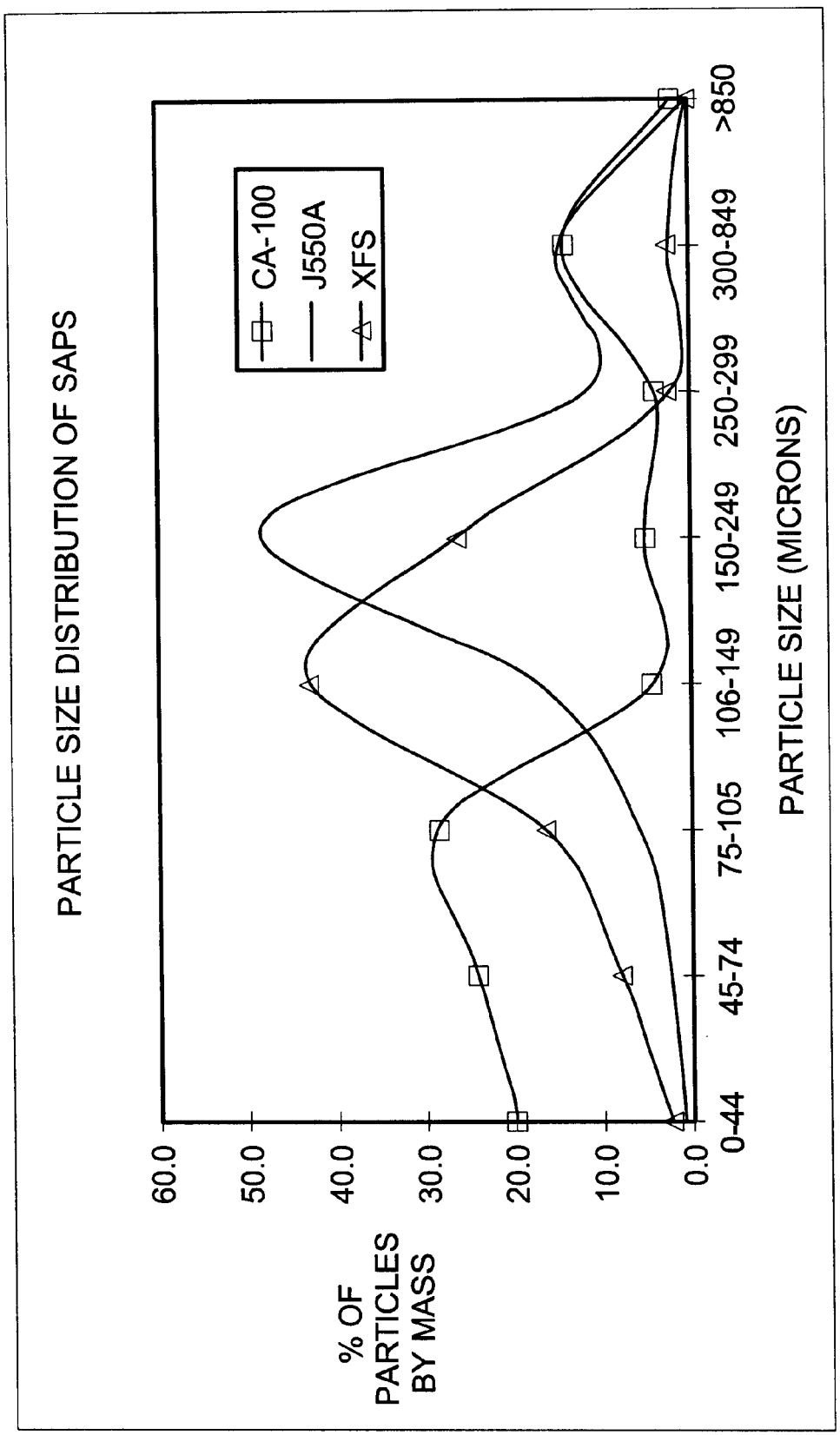
FIG. 3 is a graph illustrating Particle Size Distributions in percentage of mass of representative SAPs utilized in the composition.

Comparisons of the data in Tables 1–3 are also shown in FIG. 3.

EXAMPLE 1

Specimens in this example were made by compounding approximately 200 g of a mixture of XFS in DYNK via a compound mixer at 190° C. to form sheets of 5.3 mm in thickness. Specimens were formed by pressing each sheet into a mold that formed six rectangular sticks of 6.35 mm by 133.35 mm by 3.175 mm, with each stick weighing approximately 2.5 g. The sticks were made for each of the following compositions (wt % XFS/wt % DYNK): 0/100; 29.7/70.3; 39.1/60.9; and, 56.8/43.2. The sticks were subjected to testing as described hereinbefore. The LOI for each composition is shown hereinafter in Table 4.

TABLE 4

Limiting Oxygen Index (XFS in DYNK)

| Composition (wt % XFS) | LOI |
|---|---|
| 0 | 17.5 |
| 29.7 | 22.5 |
| 39.1 | 24.2 |
| 56.8 | 25.7 |

EXAMPLE 2

Specimens in this example were samples of DYNK incorporated with J550A via a compound mixer at 190° C. Specimens were formed and tested as in Example 1. Sticks of the following compositions were made (wt % J550A/wt % DYNK): 0/100; 9.1/90.9; and, 44.4/55.6. The LOI for each composition is shown hereinafter in Table 5.

TABLE 5

Limiting Oxygen Index (J550A in DYNK)

| Composition (wt % J550A) | LOI |
|---|---|
| 0 | 17.5 |
| 9.1 | 18.3 |
| 44.4 | 24.0 |

EXAMPLE 3

As mentioned hereinbefore, XFS alone was not capable of being pressed into sticks; therefore, an alternative method of determining the LOI of UFS was utilized. Approximately 4 g of XFS powder (5.55% moisture by weight) was placed in a 63.5 mm diameter and 15.875 mm deep pan. The pan was placed in the test column and the amount of oxygen and nitrogen entering the column was set. An ignition source was placed against the surface of the powder, held for approximately 3 seconds, and then removed. A stopwatch was started as soon as the ignition source was removed. The stopwatch was then stopped when no flame or no burning embers remained in the powder. The burning time was then recorded for each mixture of oxygen/nitrogen tested. Representative LOIs for XFS are provided hereinafter in Table 6.

TABLE 6

Limiting Oxygen Index (XFS, 5.55% moisture)

| LOI (%) | Time burning (seconds) |
|---|---|
| 25.1 | 0 |
| 29.9 | 0 |
| 35.3 | 1 |
| 39.0 | 1 |
| 41.0 | 55 |
| 42.3 | 70 |
| 47.5 | 126 |

EXAMPLE 4

The J550A alone was not capable of being pressed into sticks; therefore, the alternative method of determining LOI, as described in Example 3, was utilized. Representative LOIs for J550A (10.3% moisture by weight) are provided hereinafter in Table 7.

TABLE 7

Limiting Oxygen Index (J550A, 10.3% moisture)

| LOI (%) | Time burning (seconds) |
|---|---|
| 24.7 | 0 |
| 30.2 | 0 |
| 33.1 | 0 |
| 39.2 | 2 |
| 43.1 | 2 |
| 44.6 | 3 |
| 46.6 | 56 |
| 49.4 | 86 |
| 53.8 | 119 |

EXAMPLE 5

The LOI of CA-100 alone was determined by the alternative method described hereinbefore in Examples 3 and 4.

Representative LOIs for CA-100 (10.0% moisture by weight) are provided hereinafter in Table 8.

TABLE 8

Limiting Oxygen Index (CA-100, 10.0% moisture)

| LOI (%) | Time burning (seconds) |
|---|---|
| 41.6 | 0 |
| 48.3 | 0 |
| 55.9 | 0 |
| 62.4 | 1 |
| 68.9 | 5 |
| 73.0 | 16 |
| 77.5 | 20 |
| 81.8 | 79 |

EXAMPLE 6

In order to demonstrate the effect of moisture content on the flame-retardance of SAPs, the LOI was determined for another set of XFS samples (these samples included a higher moisture content than the first set of XFS samples). Each sample consisted of approximately 4 grams of powder in a 63.5 mm diameter and 15.875 mm deep pan. Increased moisture content in the samples was attained by placing the XFS samples in a chamber set at 23° C., 70% relative humidity. The samples were "aged" in the chamber for 4 hours, stirring the samples after each hour. Testing was then carried out using the alternate method of determining LOI, as described in Example 3. Representative LOI's for XFS (22.7% moisture) are provided hereinafter in Table 9.

TABLE 9

Limiting Oxygen Index (XFS, 22.7% moisture)

| LOI (%) | Time burning (seconds) |
|---|---|
| 39.6 | 0 |
| 44.0 | 0 |
| 50.3 | 0 |
| 49.3 | 2 |
| 51.7 | 8 |
| 53.8 | 20 |
| 56.9 | 27 |
| 59.1 | 120 |

EXAMPLE 7

In this example, LOIs were determined for another set of J550A samples (these samples included a higher moisture content than the first set of J550A samples). Sample preparation, size, and testing were carried out as described in Example 6. Representative LOI's for J550A (23.3% moisture) are provided hereinafter in Table 10.

TABLE 10

Limiting Oxygen Index (J550A, 23.3% moisture)

| LOI (%) | Time burning (seconds) |
|---|---|
| 28.6 | 0 |
| 48.1 | 0 |
| 57.1 | 0 |
| 64.1 | 5 |
| 65.5 | 6 |

TABLE 10-continued

Limiting Oxygen Index (J550A, 23.3% moisture)

| LOI (%) | Time burning (seconds) |
|---|---|
| 61.1 | 16 |
| 69.0 | 99 |

EXAMPLE 8

In this example, LOIs were determined for another set of CA-100 samples (these samples included a higher moisture content than the first set of CA-100 samples). Sample preparation, size, and testing were carried out as described in Examples 6 and 7. Representative LOI's for CA-100 (21.7% moisture) are provided hereinafter in Table 11.

TABLE 11

Limiting Oxygen Index (CA-100, 21.7% moisture)

| LOI (%) | Time burning (seconds) |
|---|---|
| 46.5 | 0 |
| 61.4 | 0 |
| 69.7 | 0 |
| 83.0 | 0 |
| 99.7 | 0 |

EXAMPLE 9

In order to further demonstrate the effect of moisture content on the flame-retardance of SAPs, the LOI was determined for another set of XFS samples (these samples included a higher moisture content than the first and second sets of XFS samples). Each sample consisted of approximately 4 grams of powder in a 63.5 mm diameter and 15.875 mm deep pan. Increased moisture content in the samples was attained by placing the XFS samples in a chamber set at 23° C., 75% relative humidity. The samples were "aged" in the chamber for 7 hours, stirring the samples after each hour. Testing was then carried out using the alternate method of determining LOI, as described in Example 3. Representative LOI's for XFS (28.3% moisture) are provided hereinafter in Table 12.

TABLE 12

Limiting Oxygen Index (XFS, 28.3% moisture)

| LOI (%) | Time burning (seconds) |
|---|---|
| 33.1 | 0 |
| 50.2 | 0 |
| 60.4 | 0 |
| 66.0 | 3 |
| 70.0 | 11 |
| 75.6 | 74 |
| 72.5 | 89 |
| 68.6 | 110 |

EXAMPLE 10

In this example, LOIs were determined for another set of J550A samples (these samples included a higher moisture content than the first and second sets of J550A samples).

Sample preparation, size, and testing were carried out as described in Example 9. Representative LOI's for J550A (28.7% moisture) are provided hereinafter in Table 13.

TABLE 13

Limiting Oxygen Index (J550A, 28.7% moisture)

| LOI (%) | Time burning (seconds) |
|---|---|
| 34.5 | 0 |
| 49.8 | 0 |
| 62.3 | 0 |
| 70.3 | 1 |
| 78.4 | 1 |
| 80.1 | 90 |
| 79.0 | 165 |
| 83.5 | 360 |

EXAMPLE 11

In this example, LOIs were determined for another set of CA-100 samples (these samples included a higher moisture content than the first and second sets of CA-100 samples). Sample preparation, size, and testing were carried out as described in Examples 9 and 10. Representative LOI's for CA-100 (26.4% moisture) are provided hereinafter in Table 14.

TABLE 14

Limiting Oxygen Index (CA-100, 26.4% moisture)

| LOI (%) | Time burning (seconds) |
|---|---|
| 76.1 | 0 |
| 80.0 | 0 |
| 86.7 | 0 |
| 92.3 | 0 |
| 99.7 | 0 |

Figure 4:
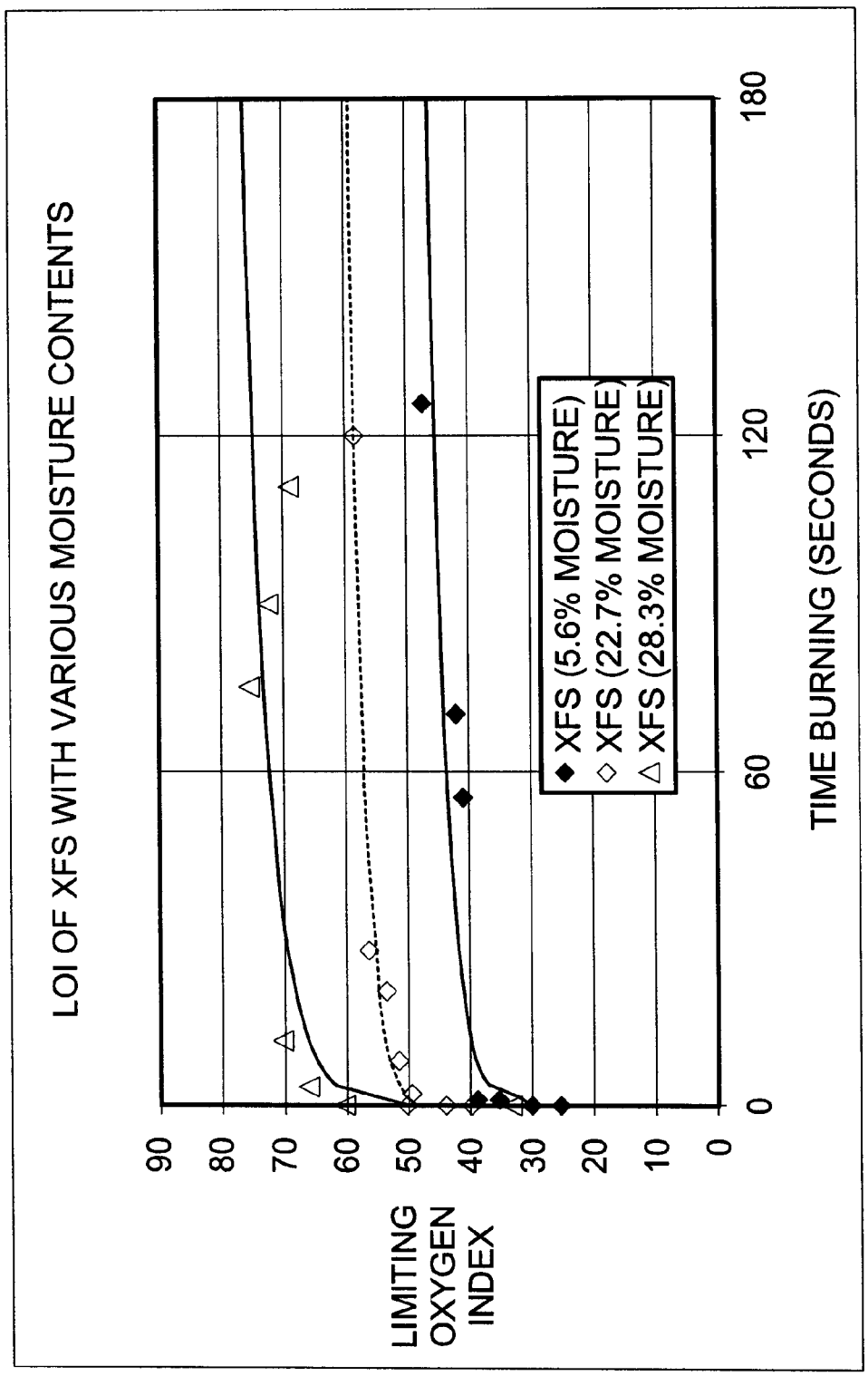
FIG. 4 is a graph illustrating Limiting Oxygen Index versus time burning for a representative SAP utilized in the present invention.
Figure 5:
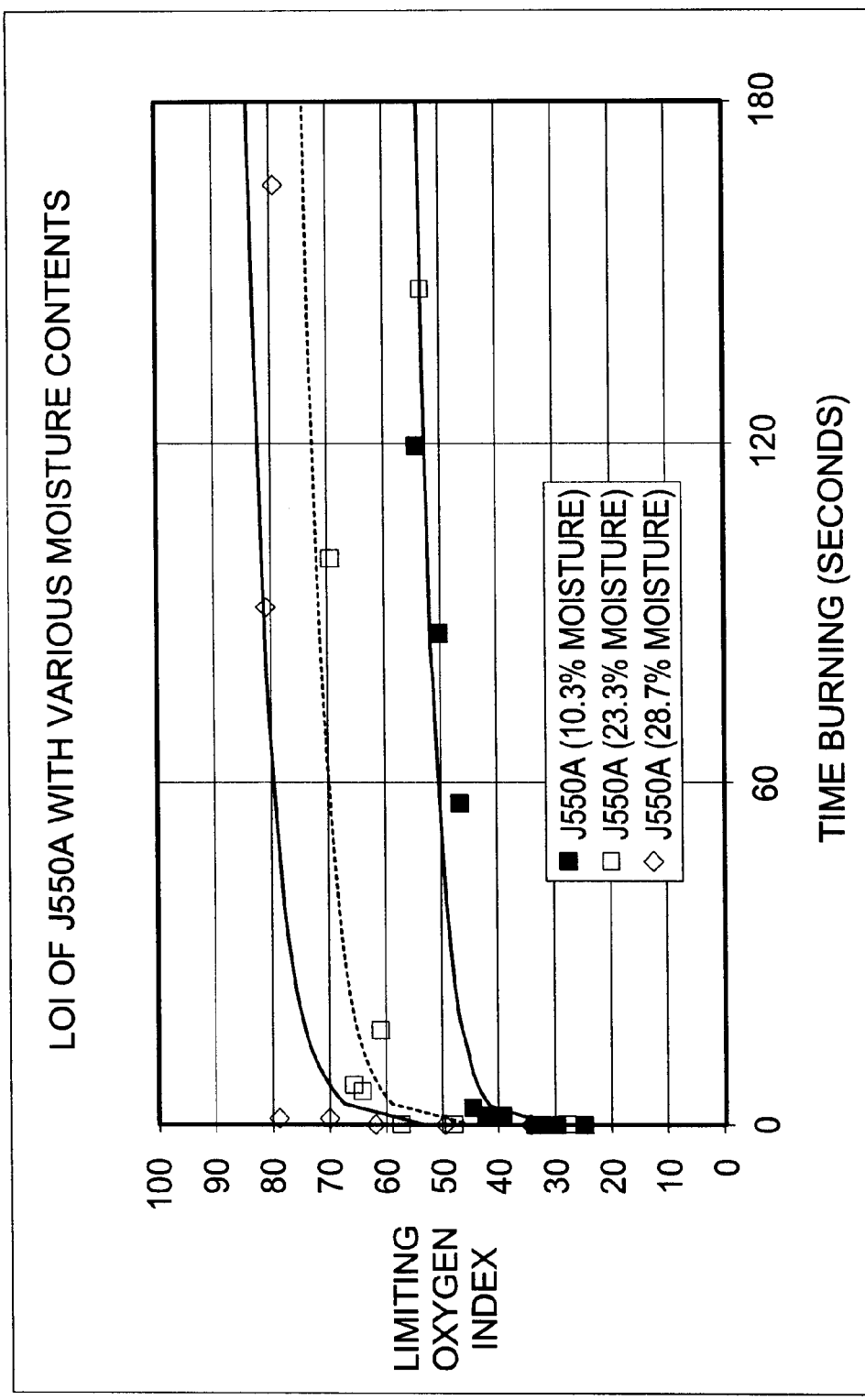
FIG. 5 is a graph illustrating Limiting Oxygen Index versus time burning for a representative SAP utilized in the present invention.
Figure 6:
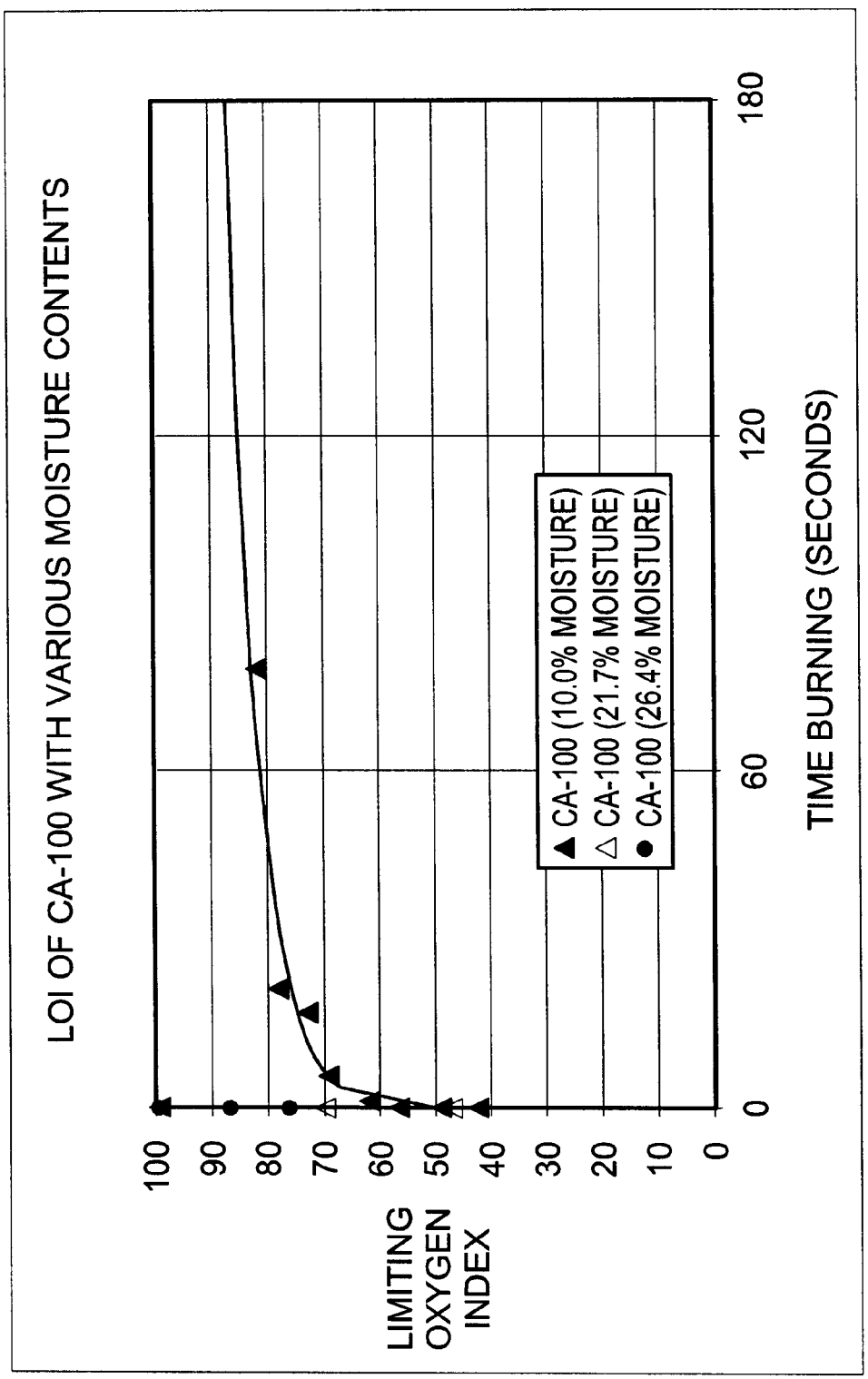
FIG. 6 is a graph illustrating Limiting Oxygen Index versus time burning for a representative SAP utilized in the present invention.

In order to compare the data presented in Examples 3–11, the data was plotted as shown in FIGS. 4–6. Curves were added to determine an equation that best fits each data set. The equations for these curves are provided hereinafter in Table 15.

TABLE 15

Equations for LOI versus Time Burning Curves

| Powder (% Moisture) | Time burning (seconds) |
|---|---|
| XFS(5.6%) | y = 2.2788 ln(x) + 34.394 ($R^2$ = 0.8503) |
| XFS(22.7%) | y = 1.98 ln(x) + 48.869 ($R^2$ = 0.7773) |
| XFS(28.3%) | y = 3.6259 ln(x) + 57.481 ($R^2$ = 0.668) |
| J550A(10.3%) | y = 3.077 ln(x) + 37.501 ($R^2$ = 0.8868) |
| J550A(23.3%) | y = 3.759 ln(x) + 54.141 ($R^2$ = 0.5868) |
| J550A(28.7%) | y = 3.885 ln(x) + 63.069 ($R^2$ = 0.6293) |
| CA-100(0.0%) | y = 5.0468 ln(x) + 60.622 ($R^2$ = 0.9207) |
| CA-100(21.7%) | x = 0 |
| CA-100(26.4%) | x = 0 |

Using these equations, where "x" is "time burned" in seconds and "y" is "LOI", limiting oxygen indexes were calculated for each powder at a time of 1 minute in order to further compare the flame-retardance of each moisture/powder combination. The results are provided hereinafter in Table 16.

TABLE 16

Limiting Oxygen Index

| Powder (% moisture) | LOI (1 minute) |
|---|---|
| XFS (5.6%) | 43.7 |
| XFS (22.7%) | 57.0 |
| XFS (28.3%) | 72.3 |
| J550A (10.3%) | 50.1 |
| J550A (23.3%) | 69.5 |
| J550A (28.7%) | 79.0 |
| CA-100 (10.0%) | 81.3 |
| CA-100 (21.7%) | No burning |
| CA-100 (26.4%) | No burning |

Figure 7:
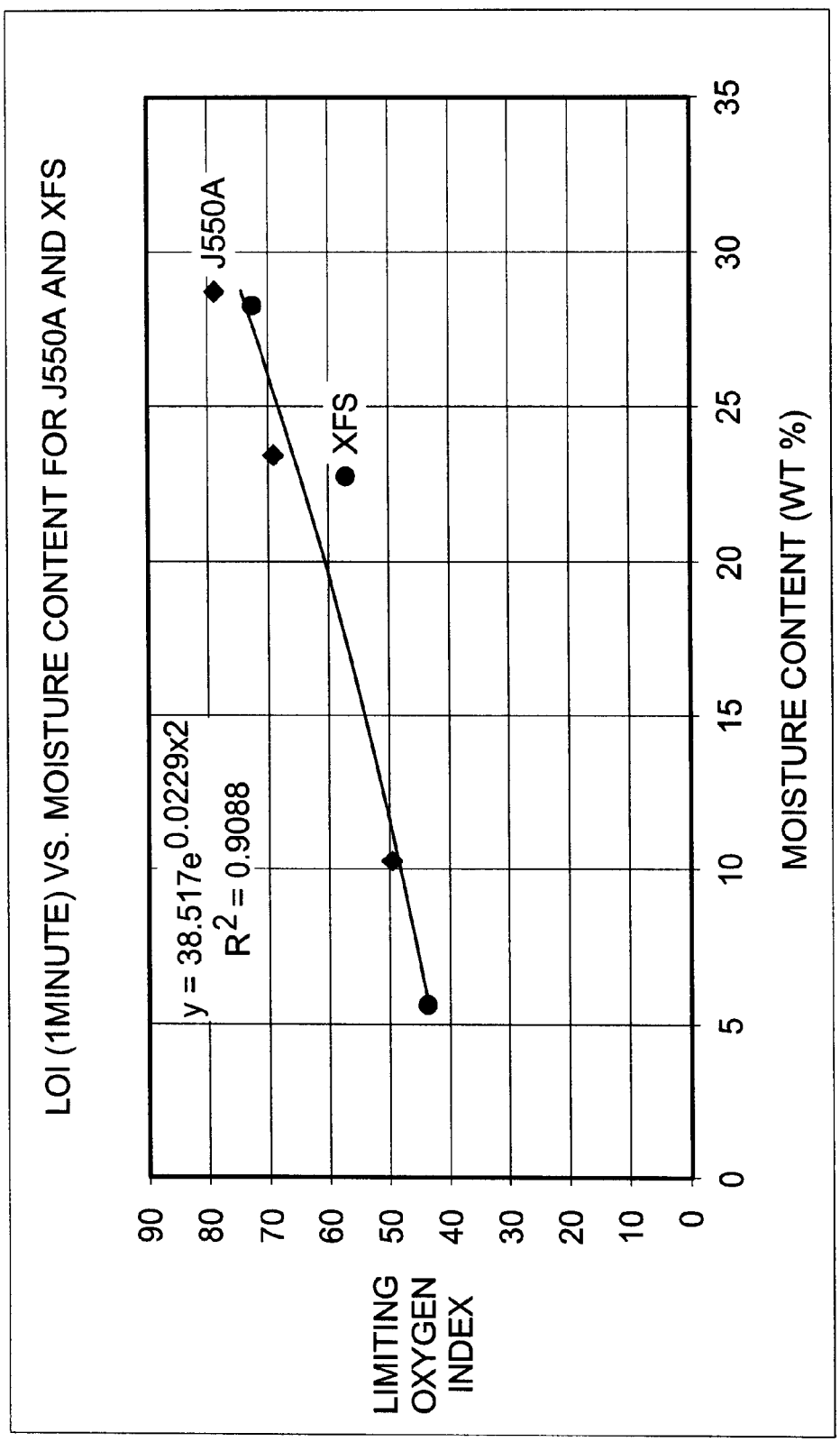
FIG. 7 is a graph illustrating the effect of moisture content on the Limiting Oxygen Index of representative SAPs.

As shown in FIG. 7, limiting oxygen indexes of J550A and XFS increase as the moisture content in these SAPs increase. Therefore, the water molecules absorbed and bonded by these SAPs enhance the flame-retardancy of the SAPs.

EXAMPLE 12

Another method that was used to demonstrate the flame-retarding capabilities of the SAPs was to determine the heat of combustion of each composition. The heat of combustion experiments were carried out in an adiabatic Oxygen Bomb Calorimeter (Model 1281, manufactured by Parr Instrument Company) according to the procedure outlined in its manual, which follows the method of ASTM D 5865-98. Two samples of each of the following compositions were tested (wt % XFS/wt % DYNK): 0/100; 29.7/70.3; 39.1/60.9; 56.8/43.2; and, 100/0. The results of each trial from the experiments were averaged and are provided hereinafter in Table 17.

TABLE 17

Heat of Combustion (XFS in DYNK)

| Composition (wt % XFS) | Heat of Combustion (BTU/lb) |
|---|---|
| 0 | 20,113 |
| 29.7 | 15,737 |
| 39.1 | 14,403 |
| 56.8 | 12,168 |
| 100 | 5,951 |

EXAMPLE 13

In this example, heat of combustion experiments were carried out according to the procedure described hereinbefore in Example 12. Two samples of each of the following compositions were tested (wt % J550A/wt % DYNK): 0/100; 9.1/90.9; 44.4/55.6; and, 100/0. The results of each trial from the experiments were averaged and are provided hereinafter in Table 18.

TABLE 18

Heat of Combustion (J550A in DYNK)

| Composition (wt % J550A) | Heat of Combustion (BTU/lb) |
|---|---|
| 0 | 20,113 |
| 9.1 | 18,897 |

TABLE 18-continued

Heat of Combustion (J550A in DYNK)

| Composition (wt % J550A) | Heat of Combustion (BTU/lb) |
|---|---|
| 44.4 | 13,842 |
| 100 | 5,967 |

Figure 8:
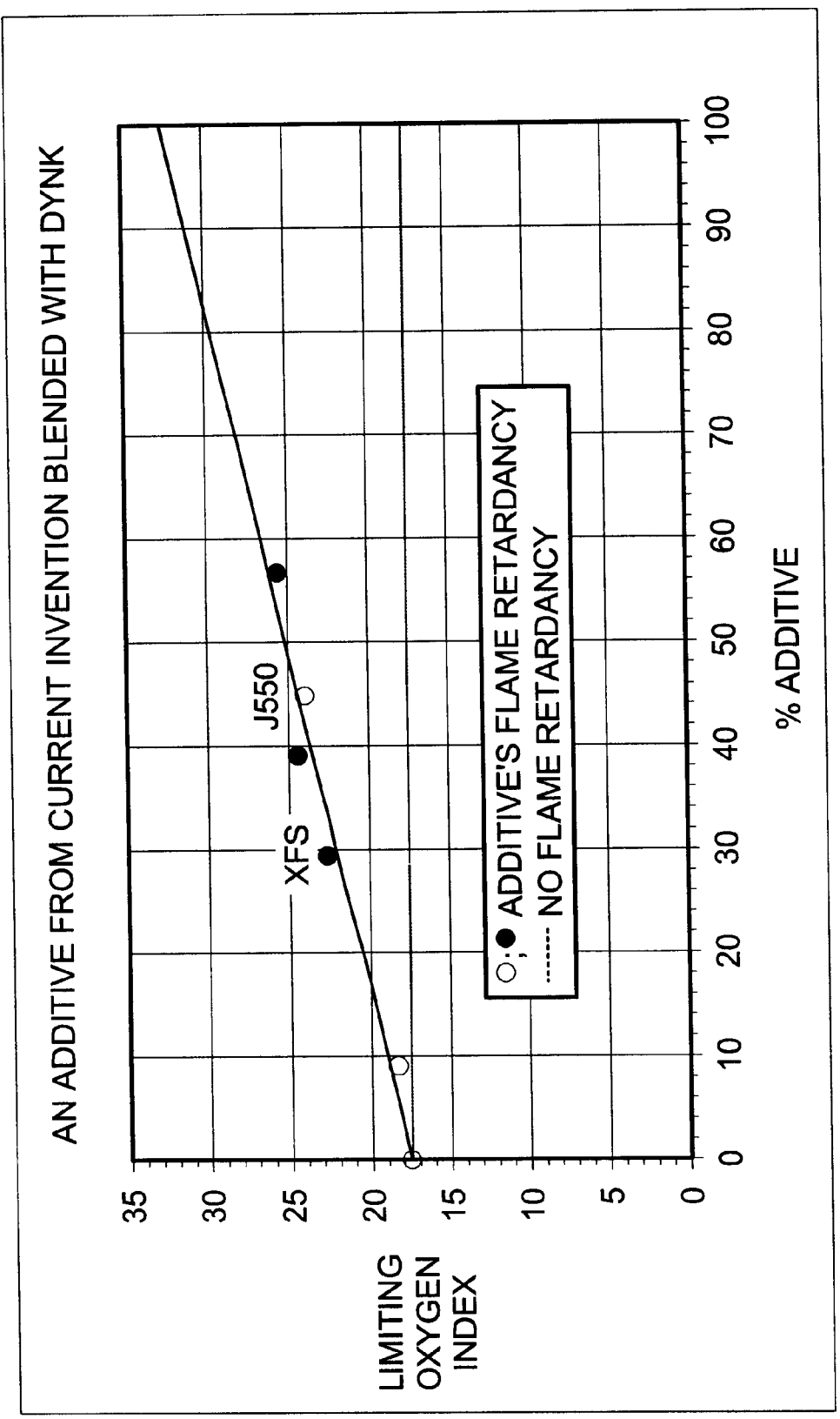
FIG. 8 is a graph illustrating Limiting Oxygen Index of a composition versus percentage of representative SAPs utilized in the composition.

As shown in FIG. 8, the test data obtained from examples 1 and 2 is provided in graphic form, with the dashed line representing projected results which would be anticipated if the addition of SAPs (XFS or J550A) to a product, i.e. a composition, were to have a negligible influence on the tested characteristics of the product. Based on the actual test data (as indicated by the solid line), it can be seen that the addition of SAPs to a product increases the LOI of the product and, in this instance, increases the LOI in an amount directly proportional to the amount of SAPs added.

Figure 9:
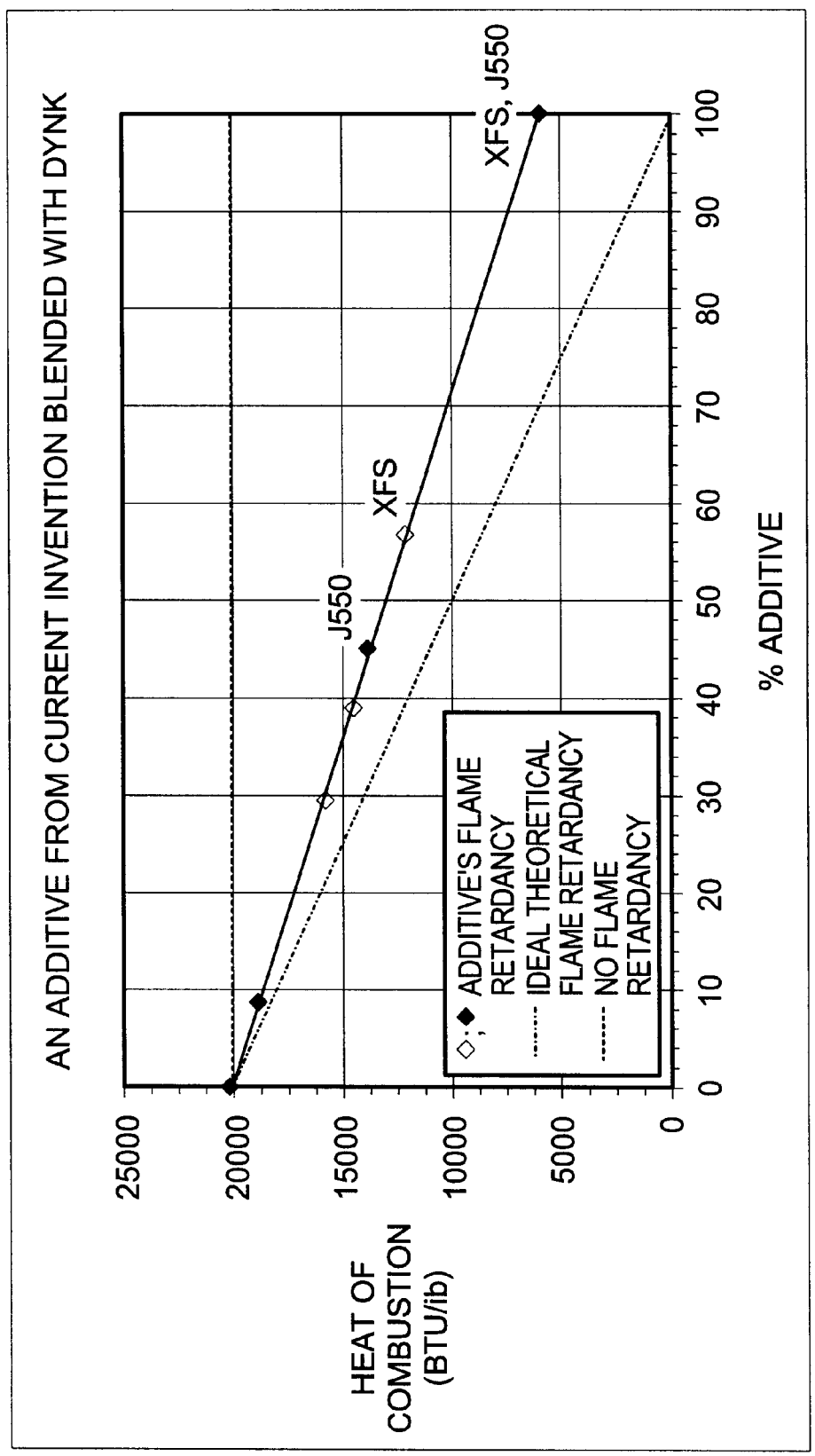
FIG. 9 is a graph illustrating Heat of Combustion of a composition versus percentage of representative SAPs utilized in the composition.

As shown in FIG. 9, the test data obtained from examples 12 and 13 is provided in graphic form, with the upper dashed line representing projected results which would be anticipated if the addition of SAPs (XFS or J550A) to a product, i.e. a composition, were to have a negligible influence on the tested characteristics of the product. The lower dashed line represents projected results which would be anticipated if the addition of SAPs (XFS or J550A) to the product were found to have an ideal influence on the tested characteristics of the product. Based on the actual test data (as indicated by the solid line), it can be seen that the addition of SAPs to a product decreases the heat of combustion of the composition and, in this instance, decreases the heat of combustion in an amount directly proportional to the amount of SAPs added.

These two conclusions are evident even though the SAPs contained a relatively low moisture level. Additionally, it has been shown hereinbefore, that increasing the moisture level in the SAPs can increase the flame-retarding characteristics of the compositions (FIGS. 4–7). The amount of moisture suitable for use in "pre-loading" the SAPs will, however, vary depending on the particular application.

The moisture level of a given SAP was determined first by weighing out three samples of about 2 grams each and recording their weight. The samples were then placed in a hot air oven for 2 hours at 100° C. Afterwards, the samples were immediately placed in a desiccator to cool for 15 minutes. Then the samples were weighed again. The moisture content of a given sample was calculated as follows:

$$M=(B-A)100/B$$

where: M is Moisture Content (wt %); B is weight of sample before drying; and, A is weight of the sample after drying.

The average moisture content and standard deviation for the three sets of SAPs samples and the six sets of "aged" SAPs samples are provided hereinafter in Table 19.

TABLE 19

Moisture Content of SAPs

| Sample | Moisture (wt %) | Std. Dev. (wt %) |
|---|---|---|
| Elf Atochem XFS | 5.55 | 0.16 |
| Elf Atochem XFS (aged 4 hrs.) | 22.65 | 0.68 |
| Elf Atochem XFS (aged 7 hrs.) | 28.27 | 3.41 |
| Aqua Keep J550A | 10.30 | 0.04 |

TABLE 19-continued

Moisture Content of SAPs

| Sample | Moisture (wt %) | Std. Dev. (wt %) |
|---|---|---|
| Aqua Keep J550A (aged 4 hrs.) | 23.29 | 1.08 |
| Aqua Keep J550A (aged 4 hrs.) | 28.68 | 0.38 |
| Stockhausen CA-100 | 10.02 | 0.30 |
| Stockhausen CA-100 (aged 4 hrs.) | 21.67 | 0.76 |
| Stockhausen CA-100 (aged 7 hrs.) | 26.41 | 0.48 |

As shown in FIGS. 4–7, the test data from examples 3–11 is provided in graphic form. It can be seen, when comparing the curves of the different moisture levels, that an increase in the moisture content of these polymers causes an increase in the LOI of these polymers. This directly suggests that increasing moisture content in SAPs increases the SAPs' flame-retardant properties.

In order to show that the prior art flame retardants inhibit the absorbency of SAPs, an additional series of tests was performed to determine the absorbency of J550A when increasing amounts of prior flame retardants or salts were added. The substances that were tested were magnesium hydroxide, zinc borate, potassium chloride, sodium chloride, and calcium chloride.

EXAMPLE 14

In this example, samples of J550A were tested in accordance with a standard free swell test. The samples of J550A powder weighed approximately 0.5 grams. Each sample was placed in a separate container with increasing amounts of magnesium hydroxide added to the containers as set forth in Table 20. Approximately 400 grams of distilled water was poured into each container. The samples, magnesium hydroxide and water were stirred as needed to ensure adequate mixing. After 30 minutes, the container contents were strained on a U.S. Standard Testing Sieve (NO. 35) for 10 minutes. Material remaining on the sieve after straining was weighed and the weight recorded. Absorbency for each sample was calculated by the following formula:

Absorbency=[(gel mass)−(initial sample mass)]/initial sample mass

The results of the testing are found hereinafter in Table 20.

TABLE 20

Magnesium Hydroxide's Effect on the Absorbency of J550A

| Weight % Mg(OH)$_2$ in Distilled Water | Absorbency |
|---|---|
| 0.01 | 534.9 |
| 0.02 | 510.0 |
| 0.1 | 381.7 |
| 0.2 | 338.3 |
| 0.9 | 280.7 |
| 1.5 | 227.7 |
| 2.0 | 218.9 |
| 2.5 | 198.3 |
| 3.0 | 188.5 |

EXAMPLE 15

Testing was performed as in Example 14, except zinc borate was used in place of magnesium hydroxide for each trial. The results of the testing are found hereinafter in Table 21.

TABLE 21

Zinc Borate's Effect on the Absorbency of J550A

| Weight % 2 ZnO*3 B₂O₃*3.5 H₂O in Distilled Water | Absorbency |
|---|---|
| 0.01 | 498.8 |
| 0.02 | 471.5 |
| 0.1 | 267.4 |
| 0.2 | 176.3 |
| 0.9 | 96.5 |
| 1.5 | 93.6 |
| 2.0 | 102.6 |
| 2.5 | 107.2 |
| 3.0 | 109.5 |

EXAMPLE 16

Testing was performed as in Example 14, except potassium chloride was used in place of magnesium hydroxide for each trial. The results of the testing are found hereinafter in Table 22.

TABLE 22

Potassium Chloride's Effect on the Absorbency of J550A

| Weight % KCl in Distilled Water | Absorbency |
|---|---|
| 0.01 | 411.7 |
| 0.02 | 361.2 |
| 0.1 | 203.4 |
| 0.2 | 162.1 |
| 0.9 | 87.7 |
| 1.5 | 70.3 |
| 2.0 | 60.6 |
| 2.5 | 58.0 |
| 3.0 | 51.9 |

EXAMPLE 17

Testing was performed as in Example 14, except sodium chloride was used in place of magnesium hydroxide for each trial. The results of the testing are found hereinafter in Table 23.

TABLE 23

Sodium Chloride's Effect on the Absorbency of J550A

| Weight % NaCl in Distilled Water | Absorbency |
|---|---|
| 0.01 | 394.6 |
| 0.02 | 351.6 |
| 0.1 | 189.3 |
| 0.2 | 138.7 |
| 0.9 | 75.1 |
| 1.5 | 55.4 |
| 2.0 | 51.1 |
| 2.5 | 42.1 |
| 3.0 | 44.4 |

EXAMPLE 18

Testing was performed as in Example 14, except calcium chloride was used in place of magnesium hydroxide for each trial. The results of the testing are found hereinafter in Table 24.

TABLE 24

Calcium Chloride's Effect on the Absorbency of J550A

| Weight % CaCl₂ in Distilled Water | Absorbency |
|---|---|
| 0.01 | 370.7 |
| 0.02 | 287.6 |
| 0.1 | 5.8 |
| 0.2 | 4.5 |
| 0.9 | 2.3 |
| 1.5 | 1.6 |
| 2.0 | 2.0 |
| 2.5 | 1.7 |
| 3.0 | 2.1 |

Figure 10:
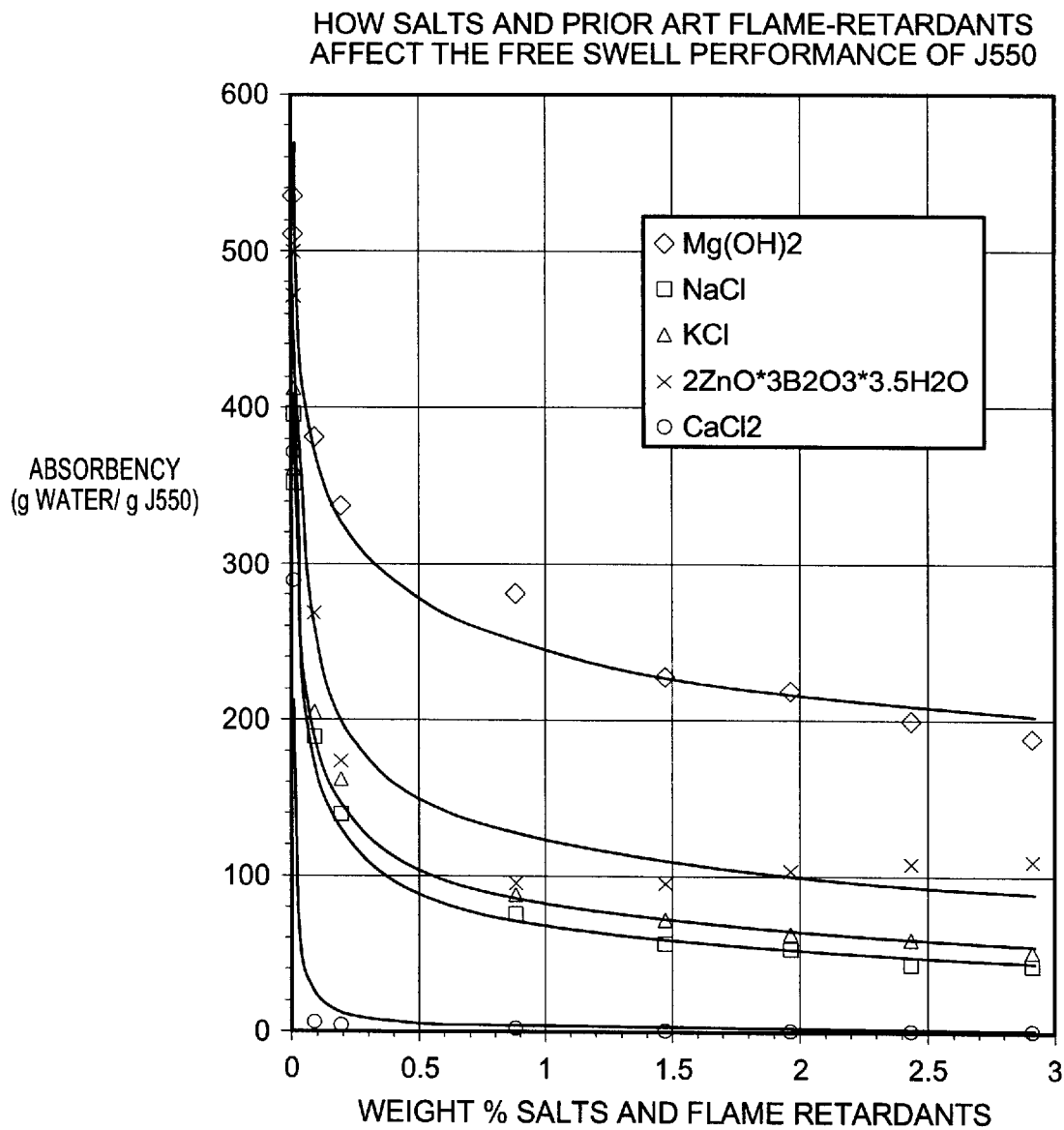
FIG. 10 is a graph illustrating the effects of prior art flame-retardants on the absorbency of a representative SAP.

In order to compare the data presented in examples 14 through 18, the data was plotted as shown in FIG. 10. It can be seen from this figure that even a small amount of prior art flame retardants or salts in the presence of J550A reduces the absorbency of the SAP to the point where the SAPs could become incapable of water-blocking. Additionally, curves were added to determine an equation that best fits each data set. The equations for these curves are provided hereinafter in Table 25.

TABLE 25

Equations for Absorbency versus Weight of Flame-Retardants

| Material | Equations |
|---|---|
| Mg(OH)₂ | $y = 246.21x^{-0.1818}$ ($R^2$ 0.9803) |
| 2 ZnO*3 B₂O₃*3.5 H₂O | $y = 122.66x^{-0.3085}$ ($R^3$ 0.9379) |
| KCl | $y = 81.822x^{-0.3722}$ ($R^2$ '2 0.9951) |
| NaCl | $y = 67.954x^{-0.4083}$ ($R^2 = 0.9931$) |
| CaCl₂ | $y = 2.7947x^{-0.9402}$ ($R^2 0.8621$) |

The foregoing description has been presented for purposes of illustration and description. It is not intended to be exhaustive or to limit the invention to the precise forms disclosed. Obvious modifications or variations are possible in light of the above teachings. The embodiment discussed, however, was chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

We claim:

1. A method for providing flame-retarding in a product, said method comprising the steps of:
   providing a composition having a first limiting oxygen index;
   adding superabsorbent polymer to the composition to form a first mixture, the first mixture having a second limiting oxygen index, the second limiting oxygen index being higher than the first limiting oxygen index, wherein the step of adding superabsorbent polymer comprises adjusting the moisture content of the superabsorbent polymer such that the second limiting oxygen index is higher than the first limiting oxygen index;
   forming a product from the first mixture, wherein the step of forming a product comprises the steps of:
   providing a transmission medium; and
   extruding the first mixture over the transmission medium to form an outer jacket such that the transmission medium is surrounded by the outer jacket.

2. The method of claim 1, wherein the superabsorbent polymer comprises at least one of the group consisting of polyacrylates, polyacrylamides, polyvinylalcohols, copolymers of polyacrylates, copolymers of polyacrylamides, copolymers of polyvinylalcohols, copolymers of polyacrylates and polyacrylamides, copolymers of polyacrylates and polyvinylalcohols, and copolymers of polyacrylamides and polyvinylalcohols.

3. The method of claim 1, wherein the superabsorbent polymer has a moisture content, by weight, of greater than approximately 0 percent.

4. The method of claim 1, wherein the step of adding superabsorbent polymer comprises providing the composition in powdered form and blending the superabsorbent polymers with the composition.

5. The method of claim 1, wherein the composition is a polymer.

\* \* \* \* \*